(12) United States Patent
Smith et al.

(10) Patent No.: US 6,979,022 B2
(45) Date of Patent: Dec. 27, 2005

(54) FLEXIBLE INFLATOR WITH CO-EXTRUDED PROPELLANT AND MOISTURE BARRIER

(75) Inventors: Bradley W. Smith, Ogden, UT (US); Ivan V. Mendenhall, Providence, UT (US)

(73) Assignee: Autoliv ASP, Inc., Ogden, UT (US)

( * ) Notice: Subject to any disclaimer, the term of this patent is extended or adjusted under 35 U.S.C. 154(b) by 9 days.

(21) Appl. No.: 10/444,690

(22) Filed: May 23, 2003

(65) Prior Publication Data

US 2004/0232678 A1 Nov. 25, 2004

(51) Int. Cl.[7] .................. B60R 21/28; C06B 45/10; C06B 45/36; C06D 5/06
(52) U.S. Cl. .............. 280/741; 149/4; 149/9; 149/19.2; 149/19.4; 149/19.5; 149/92; 102/289; 102/290
(58) Field of Search .............. 280/736, 741; 149/2, 3, 4, 9; 102/289, 290

(56) References Cited

U.S. PATENT DOCUMENTS

| | | | |
|---|---|---|---|
| 2,891,475 A | 6/1959 | Dolan et al. | |
| 4,178,853 A | 12/1979 | Garrison et al. | |
| 4,220,087 A | 9/1980 | Posson | |
| 4,607,573 A * | 8/1986 | Thureson et al. | 102/275.8 |
| 4,922,823 A | 5/1990 | Rahnenführer et al. | |
| 5,540,154 A | 7/1996 | Wilcox et al. | |
| 5,540,155 A * | 7/1996 | Hill | 102/290 |
| 5,597,973 A * | 1/1997 | Gladden et al. | 102/289 |
| 5,734,123 A | 3/1998 | Wheatley et al. | |
| 5,788,270 A | 8/1998 | HÅland | |
| 6,176,517 B1 | 1/2001 | Hamilton et al. | |
| 6,340,441 B1 | 1/2002 | Meyer et al. | |
| 2003/0155757 A1 * | 8/2003 | Larsen et al. | 280/741 |

* cited by examiner

Primary Examiner—Aileen Felton
(74) Attorney, Agent, or Firm—Sally J. Brown

(57) ABSTRACT

A flexible inflator for an inflation assembly and related gas generating propellant compositions are provided. The flexible inflator includes at least one elongated strand of a propellant co-extruded with a moisture barrier. The propellant compositions are adapted for co-extrusion with a plastic sheath which forms the moisture barrier surrounding the propellant and include a binder fuel component effective to render the composition flexible and to impart sufficient adhesive properties such that the propellant composition and the plastic sheath adhere together, and an oxidizer.

24 Claims, 3 Drawing Sheets

FLEXIBLE INFLATOR WITH CO-EXTRUDED PROPELLANT AND MOISTURE BARRIER

BACKGROUND OF THE INVENTION

This invention relates generally to devices for producing a gas such as used for the inflation of inflatable elements such as in the form of cushions or curtains included in vehicular inflatable restraint systems. More particularly, this invention relates to a flexible inflator such as may be readily conformed for placement in a variety of locations within a vehicle.

It is well known to protect a vehicle occupant using a cushion or bag, e.g., an "airbag cushion" that is inflated or expanded with a gas when a vehicle experiences sudden deceleration, such as in the event of a collision. Such airbag restraint systems normally include: one or more airbag cushions, housed in an uninflated and folded condition to minimize space requirements; one or more crash sensors mounted on or to the frame or body of the vehicle to detect sudden deceleration of the vehicle; an activation system electronically triggered by the crash sensors; and an inflator device that includes a gas generating composition or propellant the combustion of which produces or supplies a gas to inflate the airbag cushion. In the event of a sudden deceleration of the vehicle, the crash sensors trigger the activation system which in turn triggers the inflator device which begins to inflate the airbag cushion in a matter of milliseconds.

Various types or forms of such inflatable restraint systems have been developed or tailored to provide desired vehicle occupant protection such as based on either or both the position or placement of the occupant within the vehicle and the direction or nature of the vehicle collision, for example. In particular, driver and passenger inflatable restraint installations have found wide usage for providing protection to drivers and front seat passengers, respectively, in the event of head-on types of vehicular collisions. Driver and passenger inflatable restraint installations do not, however, generally provide as great as may be desired protection against vehicular impacts inflicted or imposed from directions other than head-on, i.e., "side impacts". In view thereof, substantial efforts have been directed to developing inflatable restraint installations having particular effectiveness in the event of a side impact.

Inflatable curtain restraint devices are a relatively new development in the field of inflatable restraint systems. Generally, such inflatable curtain restraint devices are positioned within the vehicle frame along the ceiling adjacent the door frame of the vehicle. Typically such inflatable curtain restraint devices include an inflatable curtain designed to deploy over at least a portion of the door frame and/or window of a vehicle to cushion an occupant from impact with the door frame and/or window, particularly in the event of a side impact or rollover crash. Such inflatable curtain restraint devices also typically include an inflator device to provide an inflation fluid, typically in the form of a gas, to inflate the inflatable curtain. One such inflatable curtain restraint device is disclosed in U.S. Pat. No. 5,788,270 to HÅland et al., the disclosure of which is incorporated herein by reference.

Many types or forms of inflator devices have been disclosed in the art for use in inflatable restraint systems. One particularly common type of inflator device is commonly referred to as a pyrotechnic inflator. In such inflator devices, gas used in the inflation of an associated inflatable element is derived from the combustion of a pyrotechnic gas generating material or propellant. However, the combustion efficiency, and therefore, the effectiveness of the inflatable restraint system, can be compromised if the gas generating material or propellant is exposed to moisture or non-collision related shock or impact. In practice, therefore, the gas generating material is typically protected from moisture and shock by enclosing the material within a separate container or housing.

Pyrotechnic inflator devices, such as are used for the inflation of inflatable curtains, are commonly cylindrical in shape and typically have a length that is greater than a diameter of the inflator device. In practice, the length/diameter ratios of such inflator devices have been limited or restricted by the general need or desire to ensure relative uniformity in ignitability over the length of the inflator device. In particular, it has proven difficult to attain ignition of an extended length of pyrotechnic gas generant or propellant material in a uniform manner while in an assembly of small diameter. Moreover, inflatable restraints such as inflatable curtains which are commonly designed to provide protection over an extended area typically need to be rapidly inflated over relatively extended lengths, as compared to common front impact inflatable restraint devices. The provision of inflation gas produced by the combustion of pyrotechnic gas generant or propellant materials along extended lengths in a desirably uniform and rapid manner can be particularly challenging to achieve.

Many of today's vehicles have a rounded or contoured chassis to promote aerodynamic performance and improved fuel efficiency. As result, the locations within the vehicle wherein inflatable curtain restraint devices are typically disposed are correspondingly contoured or curved. Thus, the inflatable curtain restraint device including the inflator device, and, preferably, the individual components thereof, are advantageously flexible to allow the inflator device to conform to the contours of a wide variety of vehicles.

In addition to the above challenges, manufacturing, assembly and cost reduction benefits continue to be major objectives sought to be achieved in the design and development of modern vehicles and the assemblies and components included therewithin.

Thus, there is a need and a demand for a flexible inflator device that may be readily conformed to a variety of locations within a variety of vehicles that is easier and less expensive to manufacture and assemble. There is also a need and a demand for an inflator device that exhibits sufficient stability over the life of the system within a vehicle. There is a further need and a demand for an inflator device proportioned for use with an inflatable curtain that provides efficient combustion of the propellant component and even inflation of the inflatable curtain. There is a still further need and a demand for an inflator device that is flexible and may be employed in a variety of vehicle sizes and types and/or in a variety of locations and orientations within a vehicle.

SUMMARY OF THE INVENTION

A general object of the invention is to provide an improved inflator device for the inflation of inflatable elements such as airbag cushions or inflatable curtains included in inflatable restraint systems for automobile occupants.

A more specific objective of the invention is to overcome one or more of the problems described above.

The general object of the invention can be attained, at least in part, through a flexible inflator including at least one strand of a co-extruded propellant and moisture barrier.

The prior art generally fails to provide a flexible inflator for use in a vehicular inflatable restraint system that may be readily conformed for placement in a variety of locations within a variety vehicles. Moreover, typical inflators of the prior art include two components, a gas generant or propellant composition and a container or housing, which are manufactured separately and later assembled thus incurring additional manufacture and assembly steps and expense. Additionally, many propellant compositions typically employed in inflatable restraint systems lack suitable flexibility to allow an inflator device utilized in an inflatable curtain safety restraint system to be conformed to the contours of a variety of locations within a variety of vehicles without compromising the ignition and gas generating properties of the propellant.

The invention further comprehends a gas generating propellant composition adapted for co-extrusion with a plastic sheath which is useful to form a strand including a propellant and a moisture barrier which may be used in a flexible inflator. The propellant composition includes a binder fuel component effective to render the propellant composition flexible and to impart sufficient adhesive properties whereby the propellant composition and the plastic sheath adhere together, and an oxidizer.

The invention still further comprehends an extrudable gas generating propellant composition including:
   about 5 to about 20 composition weight percent binder fuel component effective to render the composition flexible; and
   about 5 to about 80 composition weight percent oxidizer.

The invention additionally comprehends a gas generating propellant composition adapted for co-extrusion with a plastic sheath including:
   about 5 to about 20 composition weight percent binder fuel component effective to render the composition flexible and to impart sufficient adhesive properties such that the propellant composition and the plastic sheath adhere together, the binder fuel component including a polymer selected from the group consisting of polyvinyl chloride, polyesters, polyurethanes, and combinations thereof;
   about 5 to about 80 composition weight percent oxidizer; and
   about 5 to about 30 composition weight percent plasticizer.

References herein to a material or composition as a "gas generating" or the like are to be understood to refer to materials or compositions such as, when combusted with a standard oxidizer such as sodium nitrate, produces or forms at least about 2.5 moles of gas per 100 grams of composition and preferably produces or forms at least about 3.0 moles of gas per 100 grams of composition.

As used herein, references to "combustion front" or "flame front" are to be understood to refer to the essentially linear ignition of a propellant core of a co-extruded strand starting at an inner axial surface of a central bore formed in the propellant core and proceeding from a first lateral end to a longitudinally opposite second lateral end. Propagation of this combustion front must meet a minimum propagation rate to ensure proper ignition of the propellant core and inflation of an associated airbag cushion or curtain with inflation gas.

Other objects and advantages will be apparent to those skilled in the art from the following detailed description taken in conjunction with the appended claims and drawings.

DETAILED DESCRIPTION OF THE INVENTION

The present invention, as described in more detail below, provides a flexible inflator such as for the inflation of inflatable elements such as airbag cushions or inflatable curtains included in vehicular inflatable restraint systems. More particularly, the invention provides a flexible inflator including at least one strand of co-extruded propellant and moisture barrier such as may provide or furnish inflation gas via the combustion of a gas generating propellant composition in, either or both, a more timely manner or more uniformly or effectively distributed over an extended length, as may be desired for certain applications such as in the inflation of at least certain inflatable curtain restraint systems wherein the utilization or employment of such flexible inflator devices may be desired. The present invention further provides propellant compositions adapted for co-extrusion with a plastic sheath such as may be utilized or employed to form such flexible inflator devices.

Figure 1:
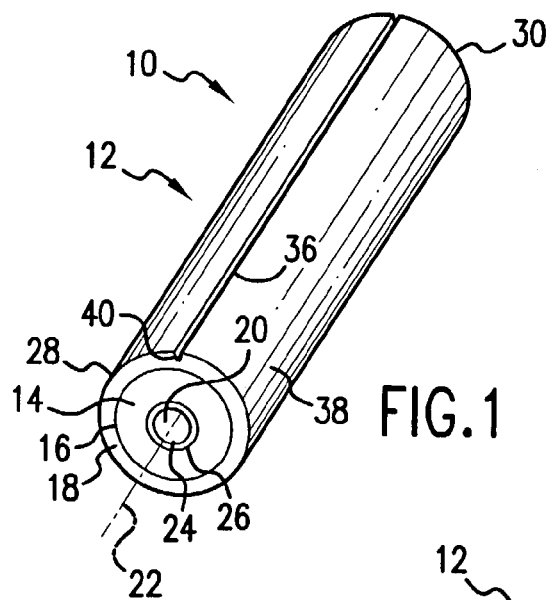
FIG. 1 is a perspective view of a flexible inflator according to certain embodiments herein disclosed.

As will be appreciated, the present invention may be embodied in a variety of different structures. Referring to FIG. 1, there is illustrated a flexible inflator, generally designated by reference numeral 10, in accordance with one preferred embodiment of the invention. The flexible inflator 10 includes a frangible seam, generally designated by reference number 36, and is generally adapted for use in association with an inflatable restraint system, as described in greater detail below. In FIG. 1, the flexible inflator 10 is shown in a static or at rest state. The flexible inflator 10 includes at least one propellant-containing strand 12 having a generally elongated tubular shape wherein a propellant forms an extruded core 14 having an outer axial surface 16. The flexible inflator 10 further includes a plastic sheath 18 co-extruded externally adjacent the outer axial surface 16 of the propellant core 14 to form a barrier that protects the propellant core from moisture. The propellant core 14 includes a central bore 20 that extends coaxially to a central longitudinal axis 22 through the propellant core 14 to form an inner axial surface 24. The central bore 20 may have a generally circular cross-section, as shown in FIG. 1, or may have other suitable cross-sections such as will be apparent to those skilled in the art and guided by the teachings herein provided.

Suitably, the propellant core 14 includes a gas generating propellant composition that is extrudable and adapted for co-extrusion with the plastic sheath 18. Such propellant compositions typically include a binder fuel component and an oxidizer. Generally, the propellant compositions of the invention may advantageously include about 5 to about 20 composition weight percent binder fuel component and about 5 to about 80 composition weight percent oxidizer.

Useful propellant composition oxidizers include alkali, alkaline earth and ammonium nitrate, nitrites and perchlorates, metal oxides, basic metal nitrates, transition metal complexes of ammonium nitrate, and combinations thereof. The oxidizer content of the propellant composition may be varied to optimize the burn rate, impact, friction, and electrostatic discharge (ESD) sensitivity, and thermal stability of the propellant composition, and thereby the propellant core 14. Advantageously, the oxidizer is selected to provide or result in a propellant composition that upon combustion achieves an effectively high burn rate and gas yield. Specific examples of suitable oxidizers include potassium perchlorate and ammonium perchlorate.

Advantageously, the binder fuel component is effective to render the propellant composition, and thereby the propellant core 14, flexible and to impart sufficient adhesive properties whereby the propellant composition adheres to the co-extruded plastic sheath 18. Examples of suitable binder fuel components include polymers such as silicones, polybutadiene, polyesters, polyvinyl chloride, polyamides, polyurethanes, polyacrylates, polyacrylamides, and combinations thereof.

In one aspect, the binder fuel component may include a crosslinkable polymer such as a silicone, a polybutadiene, a polyurethane or a combination thereof that undergoes a curing reaction to cross-link the polymer and impart cohesive forces to bind the formulation components together into a solid homogeneous mass and to impart adhesion of the propellant core 14 to the co-extruded plastic sheath 18 via either physical or chemical bonding at the surface interface of the core and the sheath. The crosslinkable polymers can have a range of molecular weights and cross-linking of the polymers can be performed to various degrees to achieve desired mechanical properties. One particularly suitable crosslinkable binder fuel component includes silicones.

In another aspect, the binder fuel component may include a polymer that is rendered extrudable via solvation with a solvent or by melt extrusion. Suitably, the polymer is solvated with a plasticizer at an elevated temperature to form a liquid phase that uniformly mixes and suspends the components of the propellant formulation and upon cooling imparts cohesive forces to bind the formulation components together into a solid homogeneous mass and to impart adhesion of the propellant core 14 to the co-extruded plastic sheath 18 via either physical or chemical bonding at the surface interface of the core and the sheath.

In practice, the propellant composition may include about 5 to about 20 composition weight percent binder fuel component and about 5 to about 30 composition weight percent plasticizer to solvate the binder fuel component. Particularly suitable binder fuel components include silicones, polybutadiene, polyesters, polyvinyl chloride, polyamides, polyurethanes, polyacrylates, polyacrylamides, and combinations thereof. Examples of suitable plasticizers include esters of dicarboxylic acids such as dioctyl adipate or esters of phthalic, sebacic or malonic acid. Silicone oils may also be used to plasticize silicone polymers.

If desired, the propellant compositions of the present invention may include an auxiliary fuel in the range of up to about 20 composition weight percent. Advantageously, the auxiliary fuel is a cool burning, nitrogen-containing organic fuel. Examples of such materials include, but are not limited to, guanidines, ureas, tetrazoles, associated derivatives thereof, and combinations thereof.

The propellant compositions of the present invention may also advantageously include a coolant. In practice, propellant compositions in accordance with the invention may desirably contain such coolant in an amount effective to achieve low flame temperature such as between about 1500 K to about 3000 K without detrimentally inhibiting combustion of the propellant composition. Generally, the propellant composition may include up to about 30 composition weight percent coolant. Examples of such coolants include alkali, alkaline earth and transition metal carbonates and oxalates, basic metal carbonates, and combinations thereof.

If desired, the propellant compositions of the present invention may further include an auxiliary oxidizer in an amount effective to optimize composition properties such as burn rate, impact, friction, and ESD sensitivity, and thermal stability to desired parameters relative to the end use of the composition. Suitably, the propellant compositions of the present invention may include such auxiliary oxidizer in an amount of up to about 60 composition weight percent. Examples of suitable auxiliary oxidizers include, but are not limited to, alkali and alkaline earth metal perchlorates, nitrates and nitrites.

Advantageously, propellant compositions in accordance with the invention may include at least a relatively small percentage of, either or both, a coolant and an auxiliary oxidizer. As will be appreciated, combustion of such propellant compositions, particularly the oxidizers, may produce undesirable by-products such as, for example, hydrochloric acid fumes. Utilizing either or both a coolant and an auxiliary oxidizer in the propellant composition provides a technique for scavenging hydrochloric acid from the gas stream via the formation of a filterable metal halide during combustion of the propellant core 14. For example, a propellant composition including a binder fuel material and an oxidizer such as ammonium perchlorate may desirably include an auxiliary oxidizer such as sodium nitrate in an amount sufficient to scavenge or react with substantially all of the hydrochloric acid liberated or formed during the combustion of the oxidizer. Suitably, propellant compositions in accordance with the invention may also include an amount of either or both a coolant or an auxiliary oxidizer effective to result in an effluent or inflation gas including less than about 7.5 milligrams/cubic meter or 5 parts per million hydrochloric acid.

Additional additives such as burn rate catalysts or processing aids may also be included in the propellant composition to catalyze the burn rate and improve processability of the composition. Generally, such additives may be included in the propellant composition in relatively minor concentrations such as no more than about 10 composition weight percent.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

One example of a propellant composition suitable for use in the present invention includes: about 5 to about 20 composition weight percent silicone binder fuel component; about 5 to about 75 composition weight percent ammonium perchlorate oxidizer; an auxiliary oxidizer in an amount of up to about 60 composition weight percent; and a coolant in an amount of up to about 30 composition weight percent.

Another example of a propellant composition of the present invention includes: about 5 to about 20 composition weight percent polyvinyl chloride binder fuel component; about 5 to about 30 composition weight percent plasticizer; about 50 to about 80 composition weight percent potassium perchlorate oxidizer; and a coolant in an amount of up to about 30 composition weight percent.

An additional example of a propellant composition adapted for co-extrusion with a plastic sheath includes: about 5 to about 20 composition weight percent polyester; about 5 to about 30 composition weight percent plasticizer; an oxidizer in an amount effective to promote efficient combustion of the propellant composition; and a coolant in an amount of up to about 30 composition weight percent.

The plastic sheath 18 may include any material capable of forming a flexible moisture barrier for the propellant core 14 and acting as a pressure confinement mechanism to enhance ignition of the propellant core 14. Advantageously, the plastic sheath 18 is strong and resistant to rupture or breakage and is capable of expanding when the propellant core 14 is ignited. That is, the plastic sheath 18 does not break into pieces or particles when the propellant core 14 is ignited and can serve as mechanism to direct generated inflation gases. Additionally, the plastic sheath 18 may include any material that facilitates co-extrusion with and integral bonding to the propellant composition. Advantageously, the plastic sheath 18 may have the same chemical make-up as the binder fuel component of the propellant composition.

The strand 12 may advantageously include a quantity of an ignition enhancer 26 disposed along at least a portion of the inner axial surface 24 formed by the central bore 20 to facilitate propagation of a flame or combustion front from a first lateral end 28 to an oppositely disposed second lateral end 30 along the length of the strand 12. In general, efficient propagation of the flame or combustion front is desired to ensure that the propellant core 14 ignites along substantially the entire length of the core and delivers inflation gas to an associated airbag cushion, particularly an inflatable curtain, along the full length of the flexible inflator 10 such as to evenly inflate the associated cushion or curtain. Advantageously, the ignition enhancer 26 is deposited along the inner axial surface 24 during extrusion of the strand 12.

In practice, the ignition enhancer 26 may include any formulation which is effective to facilitate ignition of the propellant composition. Such an ignition enhancer may include, for example, a mixture of aluminum and a nitramine fuel. Such a nitramine fuel may include cyclotrimethylenetrinitramine (RDX), cyclotetramethylenetetranitramine (HMX), and combinations thereof.

Figure 2:
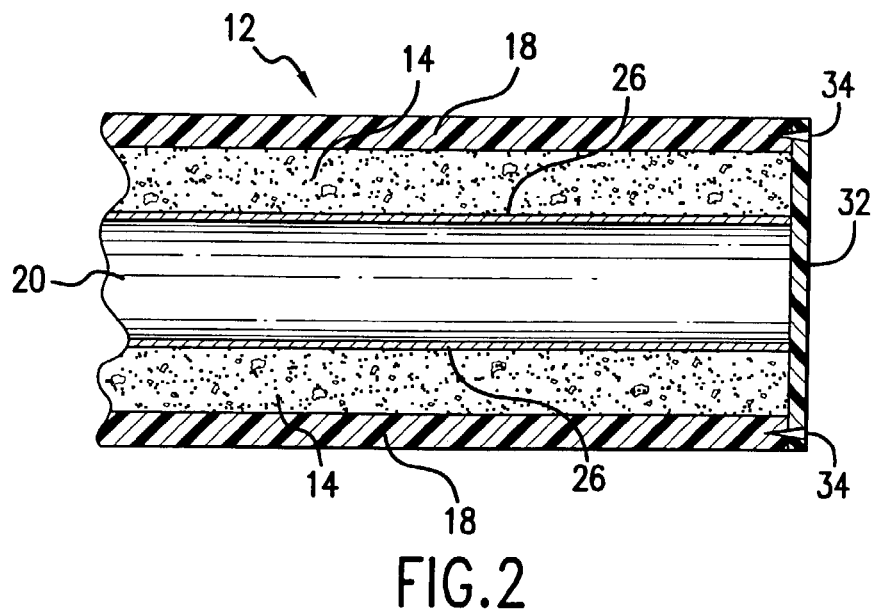
FIG. 2 is a longitudinal cross-sectional view of the flexible inflator of FIG. 1.

The strand 12 is advantageously sealed adjacent at least one lateral end of the strand to protect the propellant core 14 from moisture and to further confine pressure generated during combustion of the propellant core. FIG. 2 illustrates the strand 12 of FIG. 1 including at least a first end seal, generally designated by reference numeral 32, joined to one of the first lateral end 28 or the second lateral end 30 of the strand 12. The end seal 32 may be joined to a lateral end of the strand 12 via any suitable technique that provides for a seal that inhibits moisture penetration into the strand, particularly into the propellant core 14. Such techniques include, but are not limited to, ultrasonic welding and/or solvent or adhesive bonding. As shown in FIG. 2, such technique suitably joins the end seal 32 to the plastic sheath 18 at least at locations 34. Advantageously, the end seal 32 is joined to the plastic sheath 18 with a continuous weld or bond around the circumference of the plastic sheath.

In practice, the end seal 32 may be formed from various suitable materials that can be joined to the plastic sheath 18 to form a moisture-tight and pressure resistant seal at one lateral end of the strand 12. Advantageously, the end seal 24 may have the same chemical make-up as the plastic sheath 18.

Figure 3:
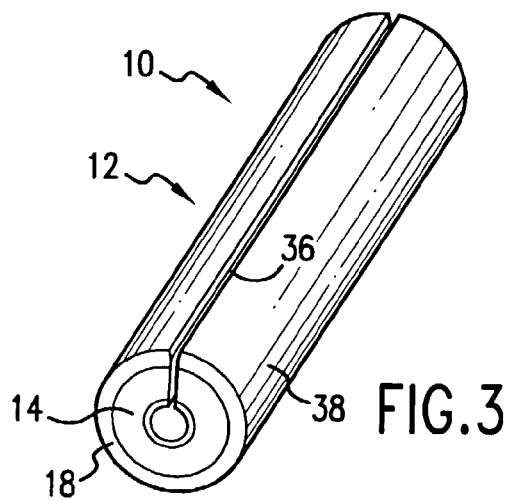
FIG. 3 is a perspective view of the flexible inflator of FIG. 1 post-ignition.

Suitably, the flexible inflator includes a system for releasing and directing inflation gas formed by combustion of the propellant core 14 such that an associated airbag cushion or inflatable curtain is evenly inflated. Referring to FIG. 1, one such system includes a frangible seam 36 extending longitudinally along at least a portion of the plastic sheath 18. Advantageously, at least a portion of the frangible seam 36 is disposed in an outer axial surface 38 of the plastic sheath 18 and is designed to rupture when the internal pressure of the strand 12, resulting from combustion of the propellant core 14, exceeds a predetermined level. Such a frangible seam 36 may include a notch 40 formed in the plastic sheath 18. As shown in FIG. 3, when the inflator device 10 has been activated both the plastic sheath 18 and the propellant core 14 can suitably rupture adjacent the frangible seam 36 such that inflation gas generated by combustion of the propellant core 14 is released along substantially the full length of the strand 12.

Figure 4:
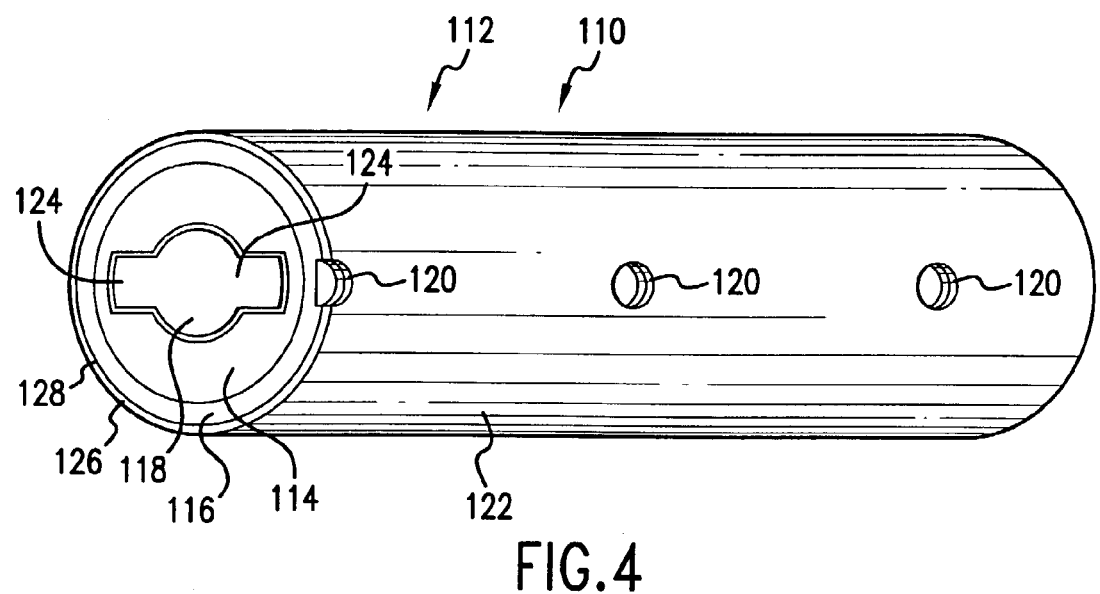
FIG. 4 is a perspective view of a flexible inflator illustrating another embodiment of the invention.

Referring now to FIG. 4, there is illustrated a flexible inflator device, generally designated by reference numeral 110, in accordance with another preferred embodiment of the invention. The flexible inflator 110 includes a propellant-containing strand 112 including an extruded propellant core 114 and an externally co-extruded plastic sheath 116. Advantageously, the propellant core 114 includes a longitudinally-extending central bore 118. Suitably, the flexible inflator 110 includes a plurality of inflation gas exit ports 120 spaced at a pre-determined distance from each other along the length of the propellant-containing strand 112. As will be appreciated, the inflation gas exit ports 120 may desirably serve to release and direct inflation gas generated by combustion of the propellant core 114 to uniformly and efficiently inflate an associated inflatable element such as an airbag cushion or inflatable curtain. Suitably, the inflation gas exit ports 120 are opened when seals or weakened areas of the plastic sheath 116 rupture or open when internal pressure, generated by combustion of the propellant core 114 of the strand 112 reaches a pre-determined level. In one aspect, the inflation gas exit ports 120 may be formed in an outer axial surface 122 of the strand 112 and extend through at least a portion of the thickness of the plastic sheath 116 such that weakened or rupturable areas are formed.

Advantageously, the central bore 118 may include connected side channels 124 that correspond to inflation gas exit ports 120. Such channels may serve to direct inflation gas toward the inflation gas exit ports 120 thereby facilitating rupture of the plastic sheath 116 in areas corresponding to the inflation gas ports 120 and release of inflation gas along the length of the strand 112.

The inflator device 110 may also include a metallized outside layer 126. Such a metallized outside layer 126 may serve to provide additional moisture barrier properties and pressure resistance, as well as, protect the strand 112 from premature rupture or fracturing of the plastic sheath 116. In accordance with one preferred embodiment of the invention, the metallized outside layer 126 is vapor deposited externally adjacent the outer axial surface 128 of the plastic sheath 116. Those skilled in the art and guided by the teachings herein provided will, however, appreciate that the broader practice of the invention is not necessarily so limited, as, for example, other suitable methods of joining or incorporating such a metallized outside layer may be employed.

Figure 5:
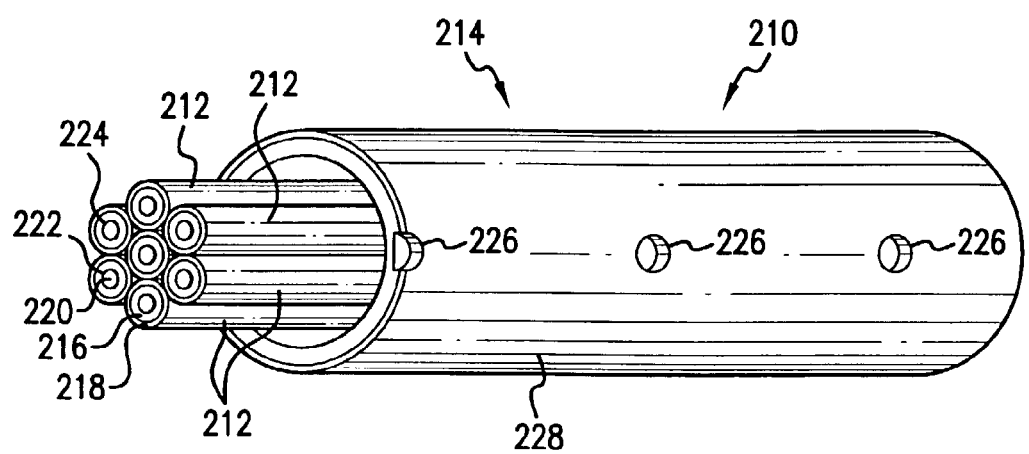
FIG. 5 is a perspective view of a flexible inflator according to certain additional embodiments.

Turning now to FIG. 5, a further preferred embodiment in accordance with the present invention is illustrated wherein a flexible inflator, generally designated by reference numeral 210, includes a plurality of propellant-containing strands, generally designated by reference numeral 212, disposed within a flexible housing, generally designated by reference numeral 214. As shown in FIG. 5, each strand 212 includes a propellant core 216 co-extruded with a plastic sheath 218 and a longitudinal central bore 220 extending through the length of the strand 212. An ignition enhancer 222 may be disposed on at least a portion of an inner axial surface 224 of the central bore 220. Although FIG. 5 depicts seven strands 212 disposed within the flexible housing 214, those skilled in the art and guided by the teachings herein provided will appreciate that the number of strands 212 disposed within the flexible housing 214 can be varied dependant upon the desired performance and/or inflation gas output.

In practice, the flexible housing 214 suitably includes a plurality of inflation gas exit ports 226 formed on an outer axial surface 228 of the flexible housing 214 and extending through at least a portion of the thickness of the flexible housing 214 to form weakened areas in the housing. Suitably, the inflation gas exit ports 226 open when the weakened areas of the housing 214 corresponding to the ports 226 rupture due to pressure generated by production of inflation gas during combustion of the propellant cores 216 of the strands 212. Advantageously, the inflation gas exit ports 226 serve to direct inflation gas along the length of the flexible inflator to evenly fill an associated airbag cushion or inflatable curtain.

Figure 6:
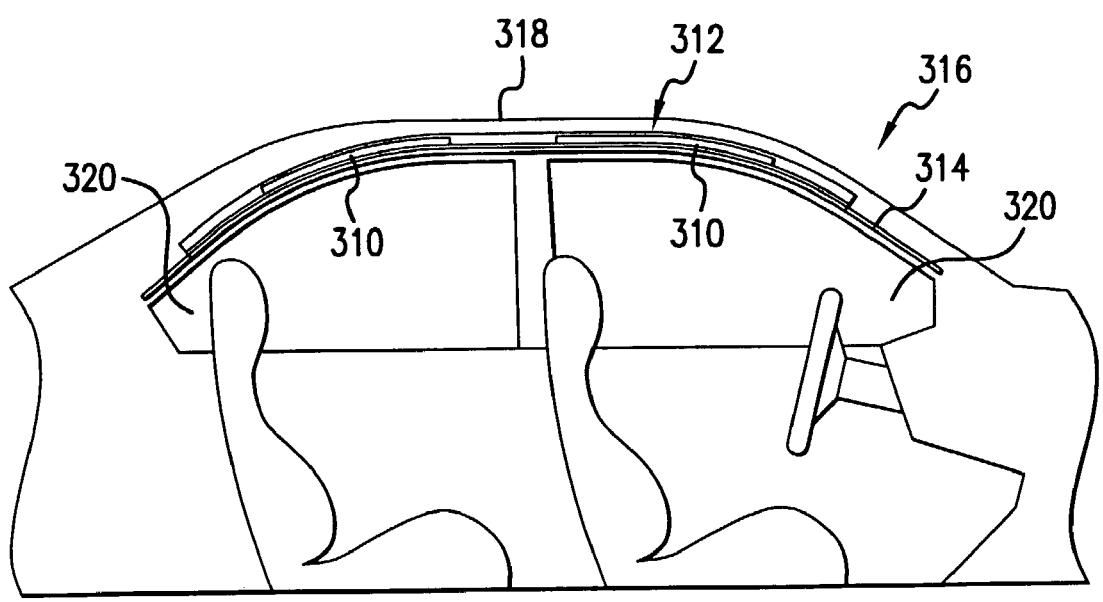
FIG. 6 is a schematic view, with cutaways to show underlying structure, of an inflatable restraint system disposed within a vehicle including a flexible inflator of the invention.

Referring now to FIG. 6, there is illustrated a flexible inflator in accordance with any of the preferred embodiments of the present invention, generally designated by reference numeral 310, as embodied in an inflation assembly, generally designated by reference numeral 312, and disposed within a vehicle. The flexible inflator 310 may be used in the inflation assembly 312 to inflate at least one associated inflatable airbag cushion such as an inflatable curtain 314. One such inflation assembly 310 may include one or more flexible inflators 312 disposed within a folded, undeployed inflatable curtain 314. In practice, the inflation assembly 312 may be disposed within a motor vehicle 316, such as along a ceiling contour 318 adjacent a side window 320, wherein the flexible inflator 310 is disposed within the motor vehicle in an arcuate shape.

Thus, the invention provides flexible inflator that includes a propellant core that is protected from moisture ingestion by a co-extruded flexible plastic sheath that forms a moisture barrier. Additionally, the invention provides gas generating propellant compositions adapted for co-extrusion with the protective plastic sheath. The invention also provides a flexible inflator that may be manufactured and/or assembled with fewer steps and reduced costs. The invention further provides a flexible inflator adapted to conform to a variety of contours within a variety of vehicles. The invention still further provides a flexible inflator including a mechanism to promote efficient ignition of a propellant core along the length of the inflator. The invention additionally provides a flexible inflator that may be used to evenly and efficiently inflate an associated inflatable airbag cushion such as an inflatable curtain airbag cushion.

Although the flexible inflator of the present invention has particular utility in connection with inflation assemblies including an inflatable curtain airbag cushion, it should be understood that such a flexible inflator is useful in all types of inflator assemblies including driver, passenger and side impact inflator assemblies. Furthermore, the propellant compositions of the invention may be employed in a number of applications that involve or require a gas generating propellant.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A flexible inflator comprising:
   at least one elongated strand of a co-extruded propellant and moisture barrier, wherein the propellant forms an extruded core having an outer axial surface and wherein the extruded propellant core includes a longitudinally-extending central bore forming an inner axial surface;
   wherein a quantity of an ignition enhancer is disposed along at least a portion of the inner axial surface of the longitudinally-extending central bore.

2. The flexible inflator of claim 1 wherein at least a portion of the quantity of the ignition enhancer is deposited along the inner axial surface of the longitudinally-extending central bore during extrusion of the strand.

3. The flexible inflator of claim 1 wherein the ignition enhancer comprises a mixture of aluminum and nitramine fuel.

4. The flexible inflator of claim 3 wherein the nitramine fuel comprises cyclotrimethylenetrinitramine.

5. A flexible inflator comprising:
   at least one elongated strand of co-extruded propellant and moisture barrier;
   wherein the propellant forms an extruded core having an outer axial surface with a circumference and the moisture barrier is co-extruded externally directly adjacent the extruded propellant core about the entire circumference of the outer axial surface.

6. The flexible inflator of claim 5 wherein the moisture barrier includes a frangible seam extending longitudinally along at least a portion of the moisture barrier.

7. The flexible inflator of claim 6 wherein the moisture barrier includes an outer axial surface and wherein at least a portion of the frangible seam is disposed in the moisture barrier outer axial surface.

8. The flexible inflator of claim 6 wherein the frangible seam comprises a notch formed in the moisture barrier.

9. The flexible inflator of claim 5 wherein the elongated strand has oppositely disposed first and second lateral ends, and wherein the flexible inflator additionally comprises at least a first end seal joined to the first lateral end.

10. The flexible inflator of claim 5 wherein the moisture barrier includes an outer axial surface having a plurality of spaced apart inflation gas exit ports.

11. The flexible inflator of claim 5 comprising a plurality of the elongated strands of the co-extruded propellant and moisture barrier and wherein the flexible inflator additionally comprises a flexible housing in which the plurality of strands are disposed.

12. The flexible inflator of claim 11 wherein the flexible housing includes an outer axial surface having a plurality of spaced apart inflation gas exit ports.

13. The flexible inflator of claim 5 wherein the propellant comprises a binder fuel selected from the group consisting of:
   silicones, polybutadiene, polyesters, polyamides, polyurethanes polyacrylates, polyacrylamides and mixtures thereof.

14. An inflation assembly comprising:
   the flexible inflator of claim 5 and
   at least one airbag cushion in inflation fluid communication with the inflator.

15. The inflation assembly of claim 14 wherein the at least one airbag cushion is an inflatable curtain air bag cushion.

16. The inflation assembly of claim 14 disposed within a motor vehicle and wherein the flexible inflator is disposed within the motor vehicle in an arcuate shape.

17. A flexible inflator comprising:
   at least one elongated strand of a co-extruded propellant and moisture barrier having a metallized outside layer;
   wherein the metallized outside layer is vapor deposited externally adjacent an outer axial surface of the extruded moisture barrier.

18. A flexible inflator comprising:
   at least one elongated strand of a co-extruded propellant and moisture barrier having a metallized outside layer;
   wherein the propellant forms an extruded core having an outer axial surface and the moisture barrier is co-extruded externally adjacent the extruded propellant core outer axial surface and the metallized outside layer is vapor deposited externally adjacent an outer axial surface of the co-extruded moisture barrier.

19. The flexible inflator of claim 1 wherein the moisture barrier is co-extruded externally adjacent the extruded propellant core outer axial surface and wherein the moisture barrier includes a frangible seam extending longitudinally along at least a portion of the moisture barrier.

20. The flexible inflator of claim 19 wherein the moisture barrier comprises an outer axial surface and the frangible seam comprises a notch formed in the moisture barrier outer axial surface.

21. A flexible inflator comprising:
   at least one elongated strand of co-extruded propellant and moisture barrier;
   wherein the propellant forms an extruded core having an outer axial surface and the moisture barrier is co-extruded externally adjacent the extruded propellant core outer axial surface and
   wherein the moisture barrier includes a frangible seam extending longitudinally along at least a portion of the moisture barrier.

22. The flexible inflator of claim 21 wherein the moisture barrier comprises an outer axial surface and the frangible seam comprises a notch formed in the moisture barrier outer axial surface.

23. The flexible inflator of claim 21 wherein the propellant comprises a binder fuel selected from the group consisting of:
   silicones, polybutadiene, polyesters, polyamides, polyurethanes polyacrylates, polyacrylamides and mixtures thereof.

24. In a flexible inflator comprising a propellant reactable to produce gas, the improvement comprising:
   a plurality of elongated strands, each of the strands comprising an extruded propellant core having an outer axial surface and a moisture barrier co-extruded externally adjacent the extruded propellant core outer axial surface.

* * * * *